United States Patent
Guering et al.

(10) Patent No.: US 9,592,771 B2
(45) Date of Patent: Mar. 14, 2017

(54) AIRCRAFT COCKPIT, IN PARTICULAR THE FRONT PORTION OF AN AIRCRAFT COCKPIT

(71) Applicant: Airbus Operations SAS, Toulouse (FR)

(72) Inventors: Bernard Guering, Montrabe (FR); Alain Depeige, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 432 days.

(21) Appl. No.: 14/230,074

(22) Filed: Mar. 31, 2014

(65) Prior Publication Data

US 2014/0209740 A1    Jul. 31, 2014

Related U.S. Application Data

(63) Continuation of application No. PCT/FR2012/052209, filed on Sep. 28, 2012.

(30) Foreign Application Priority Data

Sep. 30, 2011 (FR) ...................................... 11 58805

(51) Int. Cl.
*B60R 11/02* (2006.01)
*B64D 43/00* (2006.01)
(Continued)

(52) U.S. Cl.
CPC ...... *B60R 11/0229* (2013.01); *B64D 11/0689* (2013.01); *B64D 43/00* (2013.01); *B64D 45/00* (2013.01); *B64D 2045/0075* (2013.01)

(58) Field of Classification Search
CPC . B60R 11/0229; B64D 45/00; B64D 11/0689; B64D 43/00; B64D 2045/0075
(Continued)

(56) References Cited

U.S. PATENT DOCUMENTS 3,314,178 A    4/1967 Sayler et al.
5,222,690 A    6/1993 Jeffords
(Continued)

FOREIGN PATENT DOCUMENTS

EP    2189371    5/2010
FR    2900634    11/2007
(Continued)

OTHER PUBLICATIONS

International Search Report, Feb. 15, 2013.

*Primary Examiner* — Justin Rephann
(74) *Attorney, Agent, or Firm* — Greer, Burns & Crain Ltd.

(57) ABSTRACT

An aircraft cockpit including a viewing device comprising a screen pivotably mounted on a mounting that allows height adjustment. A screen may also be placed at the top central portion of the instrument panel. The central screen is movable between an extended position and a retracted position in which the screen does not block the view of the pilots through the cockpit windscreen. A glare screen cowl, made at least partially of a taut fabric is used to cover the viewing screens, except optionally the mobile central screen which can pass through the cowl via an opening provided for that purpose. An avionics rack may be positioned forward of the screens of the instrument panel, in which the mounting is advantageously also used to support other devices such as a rudder control system and writing shelves.

23 Claims, 11 Drawing Sheets

(51) Int. Cl.
*B64D 11/06* (2006.01)
*B64D 45/00* (2006.01)

(58) Field of Classification Search
USPC ............... 244/118.5; 361/679.04, 679.22; 248/917–924
See application file for complete search history.

(56) References Cited

U.S. PATENT DOCUMENTS

| | | | |
|---|---|---|---|
| 5,544,842 A | 8/1996 | Smith et al. | |
| 6,597,294 B1 | 7/2003 | Ariens | |
| 7,271,960 B2 * | 9/2007 | Stewart | G02B 27/0101 345/7 |
| 7,317,613 B2 * | 1/2008 | Quijano | F16M 11/02 16/323 |
| 8,028,960 B2 * | 10/2011 | Van Wassenhove | B64D 11/0689 244/118.5 |
| 8,074,950 B2 * | 12/2011 | Clary | F16M 11/04 248/276.1 |
| 8,264,838 B2 * | 9/2012 | Fujikawa | F16M 11/08 248/122.1 |
| 8,864,092 B2 * | 10/2014 | Newville | F16M 11/08 248/123.11 |
| 8,952,831 B2 * | 2/2015 | Van Staagen | B64D 43/00 340/945 |
| 8,994,561 B2 * | 3/2015 | Berger | G01C 23/00 340/971 |
| 9,284,045 B1 * | 3/2016 | Springer | G08G 5/003 |
| 9,394,053 B2 * | 7/2016 | Baudry | B64D 11/0689 |
| 9,452,839 B2 * | 9/2016 | Chatrenet | B64D 43/00 |
| 2006/0108873 A1 | 5/2006 | Hamasaki et al. | |
| 2007/0008188 A1 | 1/2007 | Firra | |
| 2007/0221807 A1 * | 9/2007 | Park | F16M 11/10 248/324 |
| 2008/0295301 A1 | 12/2008 | Carnevali | |
| 2009/0050763 A1 * | 2/2009 | Dittmer | F16M 11/10 248/284.1 |
| 2009/0128366 A1 | 5/2009 | Firra | |
| 2010/0140397 A1 | 6/2010 | Van Wassenhove et al. | |
| 2011/0084106 A1 * | 4/2011 | Bopp | B60R 11/0252 224/563 |
| 2011/0226902 A1 * | 9/2011 | Giannelli | B64D 43/00 244/129.1 |
| 2011/0241901 A1 | 10/2011 | Firra | |
| 2011/0270469 A1 * | 11/2011 | Bopp | B60R 11/02 701/3 |
| 2012/0075120 A1 * | 3/2012 | Barbieri | B64D 43/00 340/946 |

FOREIGN PATENT DOCUMENTS

| | | |
|---|---|---|
| JP | 02256596 | 10/1990 |
| JP | 2006100419 | 4/2006 |
| WO | 9508474 | 3/1995 |
| WO | 2006101417 | 9/2006 |
| WO | 2007005658 | 1/2007 |

* cited by examiner

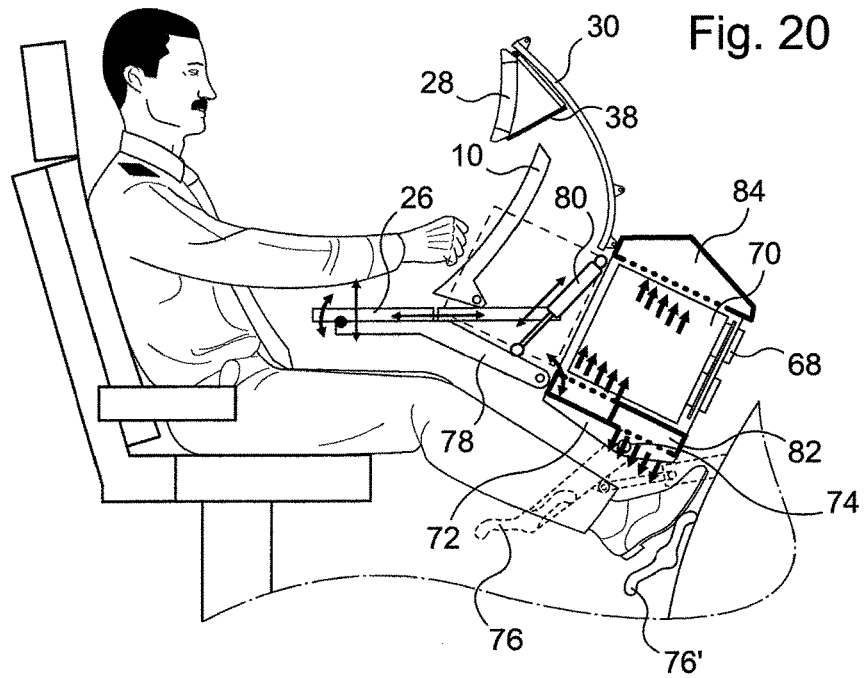
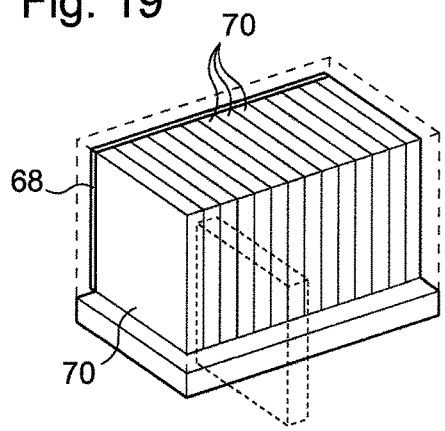
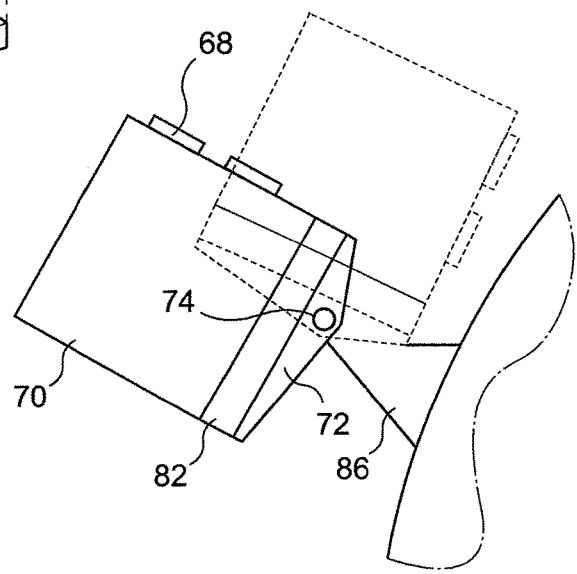

AIRCRAFT COCKPIT, IN PARTICULAR THE FRONT PORTION OF AN AIRCRAFT COCKPIT

CROSS-REFERENCES TO RELATED APPLICATIONS

This application is a continuation of International Application PCT/FR2012/052209 filed Sep. 28, 2012, designating the United States and published on Apr. 4, 2013 as WO 2013/045861. This application also claims the benefit of the French patent application No. 1158805 filed on Sep. 30, 2011, the entire disclosures of which are incorporated herein by way of reference.

BACKGROUND OF THE INVENTION

The present invention relates to an aircraft cockpit and more particularly to the arrangement of an instrument panel inside such a cockpit.

The invention is in the field of commercial aircraft for the transport of passengers and/or freight. A cockpit of such an aircraft is most frequently positioned in the nose cone of the aircraft and accommodates a flight station occupied by a pilot, optionally a co-pilot and/or a crew member such as an instructor for example. Inside the cockpit, the pilot and/or the co-pilot have available a full set of display screens and control means known in this document as an instrument panel.

The number of display screens in aircraft, or at least the display surface area, has a tendency to increase, leading naturally to an increase in the size of the instrument panels. The instrument panels thus have a tendency to become wider and wider, which results in a wider cockpit. This increasing cockpit width is detrimental when the outer aerodynamic shape of the nose cone of the aircraft is defined.

An aircraft instrument panel contains instruments having different standards and sizes, which are included in the instrument panel even if the structure required to incorporate this varied equipment is complex and therefore costly. The set of varied equipment is bulky and heavy, sensitive to vibrations and awkward to install and inspect.

SUMMARY OF THE INVENTION

The purpose of the present document is thus to propose a work environment for the pilot and optionally his co-pilot that is more ergonomic, and in particular an environment using a simplified structure, having greater accessibility and improved integration of the surrounding functions into the flight station.

To this end, there is proposed firstly a display device for an aircraft cockpit comprising a screen and a support, characterized in that the screen is mounted on its support rotatable about a first, substantially horizontal pin, and in that the support comprises means allowing height adjustment of the screen.

The screen, which is preferably a flat screen (i.e., the thickness of which is of the order of a few centimeters, for example less than 10 cm and preferably less than 2 cm), can then be adjusted as desired by its user (pilot or co-pilot) in order to avoid any reflection problems and especially in order to best adapt to the morphology of the user. Making the screen mobile can also, if the extent of the displacement is sufficient, allow access to the rear of the screen (the display face being considered the front face of the screen; on the other hand, by displacing the screen access can be gained to the space forward of the screen considering the direction of travel of the aircraft) in order to reach the connections and optionally devices installed there.

In a preferred embodiment, the screen is an incurved concave screen. Thus, on the one hand, the visual comfort of the user is improved and, on the other hand, for a similar space requirement, the display surface can be increased compared with a flat screen.

A variant embodiment of the present invention makes provision for the screen to comprise a flexible thin film for screen use, fixed on a stiff panel made from composite material.

Advantageously, provision is made for the screen to have a frame on which control buttons are placed. This feature is particularly advantageous when the screen is a touch screen. In this case, it is preferable to have a screen in the proximity of the user. This proximity can then be exploited to provide control buttons around the screen, these buttons then being placed directly within reach of the user.

In order to make the screen mobile, it is proposed that the support comprises a second, substantially horizontal, fixed pin and at least one arm having a first end rotatably mounted on the first pin and a second end bearing the second, fixed pin. By "fixed" is meant here that the second pin is preferably attached to the structure of the cockpit so that it is immobilized; the connection can nevertheless be dismantled if necessary. Preferably, the first pin and the second pin are parallel, so that the user (pilot or co-pilot) can easily bring the screen closer to him when the screen, in a fully retracted position, is situated facing the user. However, in a variant, the first pin and the second pin can define an angle between them, which allows other movement combinations.

The present invention thus relates in particular to an aircraft cockpit, characterized in that it comprises at least one display device such as described above. Such an aircraft cockpit can moreover comprise a first seat intended to accommodate a pilot, a second seat intended to accommodate a co-pilot. Provision is then advantageously made for a single screen to be placed facing the first seat, for said screen to be a screen of a display device such as described above, for a single screen to be placed facing the second seat, and for said single screen to be a screen of a display device such as described above.

The present invention relates moreover to an aircraft cockpit comprising a first seat intended to accommodate a pilot, a second seat intended to accommodate a co-pilot, at least one first display device comprising a first screen facing the first seat, at least one second display device comprising a second screen facing the second seat, and a windscreen. The display device is preferably a display device such as described above but it could also be another type of display device.

The invention here provides that the cockpit also comprises a third display device having a third, mobile, screen and a support allowing the third screen to be displaced from a first position known as a deployed position to a position known as a retracted position, that in the deployed position the third screen is above the first screen and the second screen so as to be visible both for a person seated on the first seat and for a person seated on the second seat and obscures a portion of the windscreen both for a person seated on the first seat and for a person seated on the second seat, and that in the retracted position the third screen is lowered with respect to its deployed position so as to make the portion of the windscreen obscured in the deployed position at least partially visible for a person seated on the first seat and for a person seated on the second seat.

It is proposed here, in a totally original manner, to place a screen in front of the aircraft windscreen. The regulations allow (although explicit provision is not made) a screen to be placed as mentioned above, as it is provided that the pilot (and the co-pilot) may have a visual blind spot through the center of the windscreen.

In such an aircraft cockpit, the third screen in its deployed position is preferably placed in a central position in the cockpit, and in its retracted position the third screen is for example placed partially behind the first screen and partially behind the second screen for an observer positioned on the first seat or the second seat.

The third screen is for example mobile by means of being mounted on tracks, allowing it to translate between its deployed position and its retracted position. To allow improved visibility and adaptation to the pilots, the third screen is advantageously mounted rotatable about a substantially horizontal pin.

A cockpit with a third screen such as described above can also comprise moreover a glare shield covering the first display device and the second display device. Provision is then advantageously made for the third screen, in its deployed position, to be above the glare shield, the third screen in its retracted position to be below the glare shield, and an opening to be made in the glare shield to permit the passage of the third screen when it passes from its deployed position to its retracted position or vice versa.

For the same reasons as those given above for the screen of the display device, the third screen is advantageously concave.

The present invention also proposes a glare shield of an aircraft cockpit, characterized in that it comprises a central portion and two lateral portions, and in that each lateral portion comprises, on the one hand, a piece of fabric and, on the other hand, tensioning means for holding said fabric.

In a cockpit equipped according to the invention, the ergonomics conferred by the display devices makes it possible to dispense with at least part of the item of equipment known as the "glare shield" comprising control means. As standard, this item of equipment is situated at such a height that it acts as a glare shield for the screens to protect them from light which would prevent the display on the screens from being seen. A glare shield according to the invention also makes it possible to protect the display devices from such light, while allowing a weight saving and a reduced space requirement. It is preferably situated just above the first display device (and the second if applicable), so that the third screen defined previously, in its deployed position, is situated above the glare shield.

Such a glare shield is very light, easy to install and remove, and has a very modest cost, while perfectly fulfilling its primary functions, namely preventing reflections on the display screens and protecting the electronic equipment over which it is placed.

For such a glare shield, the central portion can be a stiff portion and partially serve as a structure for holding each fabric of the lateral portions. The central portion, like the lateral portions, can also be made from taut fabric.

The tensioning means comprise for example a cable having an area with a low modulus of elasticity and at least one elastically deformable area with a substantially higher modulus of elasticity. In other words, the cable comprises a portion that does not elongate (or elongates very, very little) when placed under tension and a portion that elongates, like elastic webbing, to allow the tension of the cable to be adjusted, to hold the latter over time, and also to allow deformation of the cable in the event of impact on the latter so that it does not constitute a troublesome obstruction in the cockpit.

In order to facilitate the mounting and removal of the glare shield, its tensioning means comprise for example a zip fastener.

The present invention also relates to an aircraft cockpit, characterized in that it comprises a glare shield such as described above. Removal of the glare shield then makes it possible, for example, to gain access to a space situated behind the different display devices present in the cockpit, i.e., situated at the front of the cockpit.

An aircraft cockpit is also proposed here comprising an instrument panel incorporating at least one display screen (which is preferably a screen of a display device such as described above but which can also be of a different type), characterized in that an avionics unit is placed forward of the display screen. Moreover, the display screen is preferably a flat screen.

An avionics unit is here a unit (cabinet or similar) inside which electronic avionics equipment is housed. This arrangement for electronic avionics equipment is totally original and also advantageous. Here a space made available by the use of flat screens (the thickness of which is 10 cm at most) is used to place therein electronic avionics equipment which is moreover in a secure area there.

A variant embodiment is proposed in which a support is used to bear the avionics unit. This support can be a substantially planar support. Provision is then made for example for an electronic board, known as a motherboard, to extend substantially perpendicularly to the support and to receive electronic boards, known as daughterboards, extending substantially perpendicular both to the motherboard and to the support. In this aircraft cockpit, the avionics unit support is shaped so as to be capable of supporting an input keyboard, or a work surface as described hereinafter. The avionics unit support can moreover comprise an upper face and a lower face, the upper face receiving said avionics unit, and the lower face being shaped to support at least one rudder bar. Advantageously, the support is mounted rotatable about a fixed pin.

Finally, the present invention relates to an aircraft, characterized in that it comprises a cockpit such as one of the above-described embodiments of a cockpit.

BRIEF DESCRIPTION OF THE DRAWINGS

Details and advantages of the present invention will become more clearly apparent from the following description, given with reference to the attached diagrammatic drawings in which:

FIG. 19 shows an avionics unit able to be installed in an aircraft cockpit according to the present invention, FIG. 20 is another diagrammatic side view of a pilot positioned facing an instrument panel in a cockpit according to the present invention, and FIG. 21 shows diagrammatically an avionics bay in two different positions in a cockpit according to the present invention.

DETAILED DESCRIPTION OF THE PREFERRED EMBODIMENTS

The present description relates to an aircraft nose cone, or aircraft cockpit, intended for a commercial aircraft, i.e., intended more particularly for the transport of passengers and/or freight. It relates for example to an aircraft the fuselage of which, when fitted out for the transport of passengers, can transport approximately one hundred passengers or more.

The front portion of an aircraft is fitted out to receive the aircraft pilots. In general, in an aircraft of the aforementioned type, a pilot and a co-pilot are at the controls of the aircraft. The controls are placed in a space also known as the cockpit, positioned in the fuselage nose cone. In the present description, the terms "cockpit" and "nose cone" are considered to be substantially synonymous. Conventionally, there are two seats in the cockpit, which face an instrument panel above which there is a windscreen. The pilot is accommodated in one seat, the co-pilot in the other, so that they are both seated in the direction of travel of the aircraft. The instrument panel faces them, grouping, on the one hand, control means allowing the aircraft to be piloted and, on the other hand, display means allowing the pilot and the co-pilot to be informed on the status of the aircraft, its condition and environment. The control means can be press buttons, thumb wheels, turn buttons or even input means such as tablets or keyboards. The display means are most frequently warning lights and screens.

The number and dimensions of the various control and display means are important for dimensioning the cockpit and determining the aerodynamic shape of the whole of the front portion of the fuselage of the aircraft.

The cockpit described hereinafter is an ergonomic cockpit, the design of which takes account of the development of the various avionics systems, allowing genuine progress in the work environment of the pilots (the pilot and his co-pilot).

Figure 1:
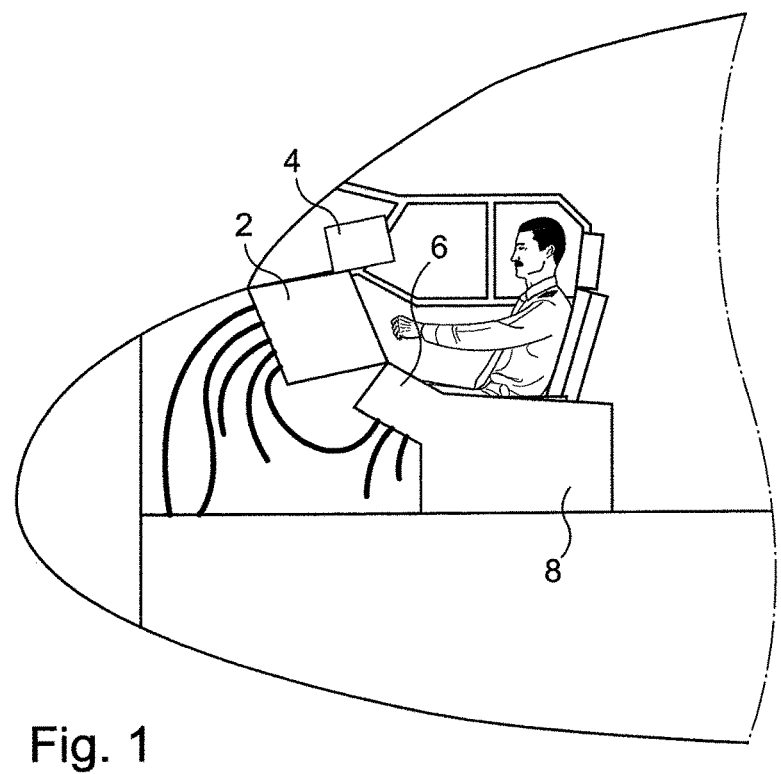
FIG. 1 is a diagrammatic side view of an aircraft cockpit of the prior art.

In FIG. 1, a cockpit of the prior art is shown diagrammatically, and more particularly the instrument panel of this cockpit and its environment. The instrument panel shown in this figure comprises a central unit 2 in which there are control screens for example. Above and overhanging the central unit, control units 4 with various control buttons form a visor above the screens, corresponding to the "glare shield" equipment mentioned previously. Below the central unit 2, a console 6 accommodates other controls and also for example input means (keyboard or other).

FIG. 1 does not show a seat for accommodation of the pilots. Such seats are intended for installation on each side of a central pylon 8 which is also used to accommodate avionics systems.

Forward of all these various command and control elements, there are numerous connection cables as well as air ducts to provide good ventilation for all the electrical and electronic instruments of the instrument panel.

The result is a complex structure for the instrument panel and the whole front portion of the aircraft.

Figure 2:
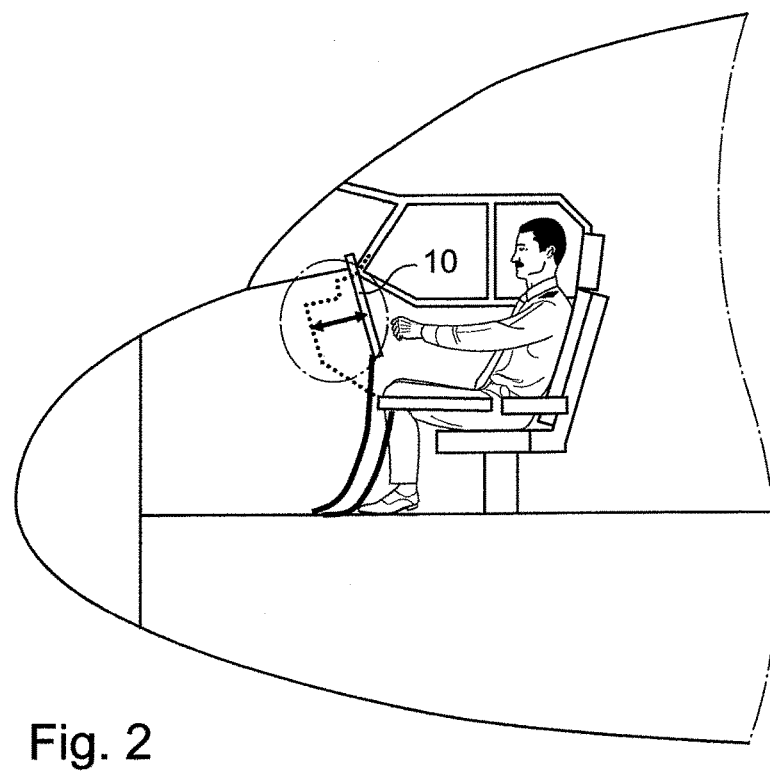
FIG. 2 is a diagrammatic side view of an aircraft cockpit according to one aspect of the invention.

FIG. 2 shows a view similar to that in FIG. 1 for a cockpit according to an aspect of the present invention. The use of flat display screens 10 and a console with control and/or input means is proposed here. In a preferred embodiment, each pilot (i.e., the pilot and the co-pilot) has an instrument panel with a single wide screen 10 and a work surface. Each screen located facing a pilot can be fully reconfigured. Preferably, these screens 10 are touch screens, which can thus also serve as control means. The corresponding structure is described in further detail hereinafter.

Figure 3:
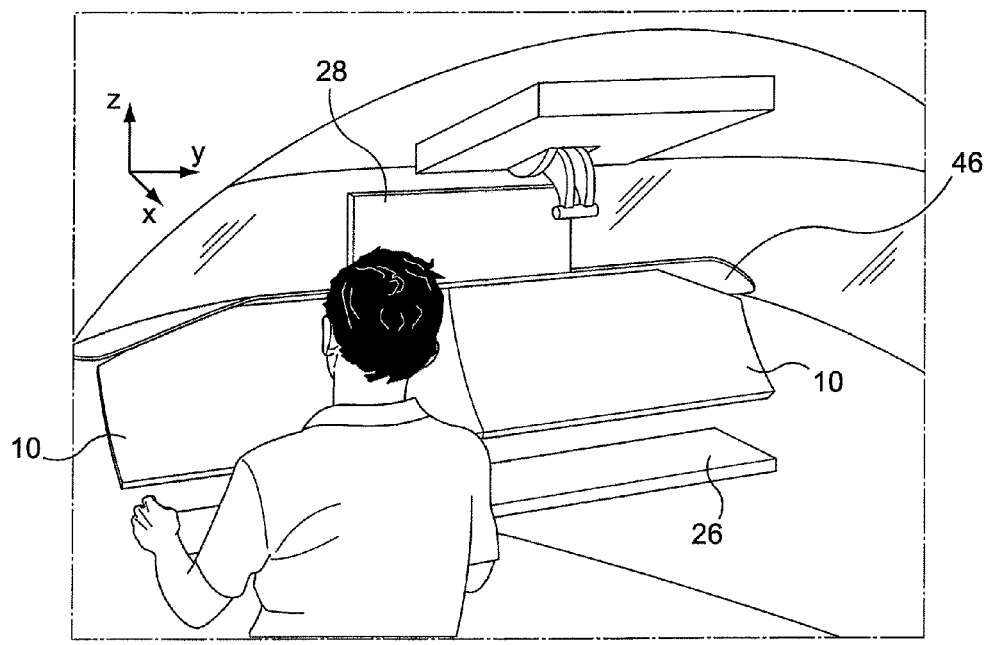
FIG. 3 is a partial perspective view of the inside of the cockpit in FIG. 2, also including other aspects of the invention.

FIG. 3 shows that there is a screen 10 facing each pilot. Thus there is a first screen 10 and a second screen 10 which are for example symmetrical with respect to a plane separating the flight stations, even preferably identical. Only one screen 10 will therefore be described hereinafter. Preferably, each pilot also has a work surface 26. The cockpit in FIG. 3 here also comprises a third, retractable, screen 28, as well as a glare shield 46.

Figure 6:
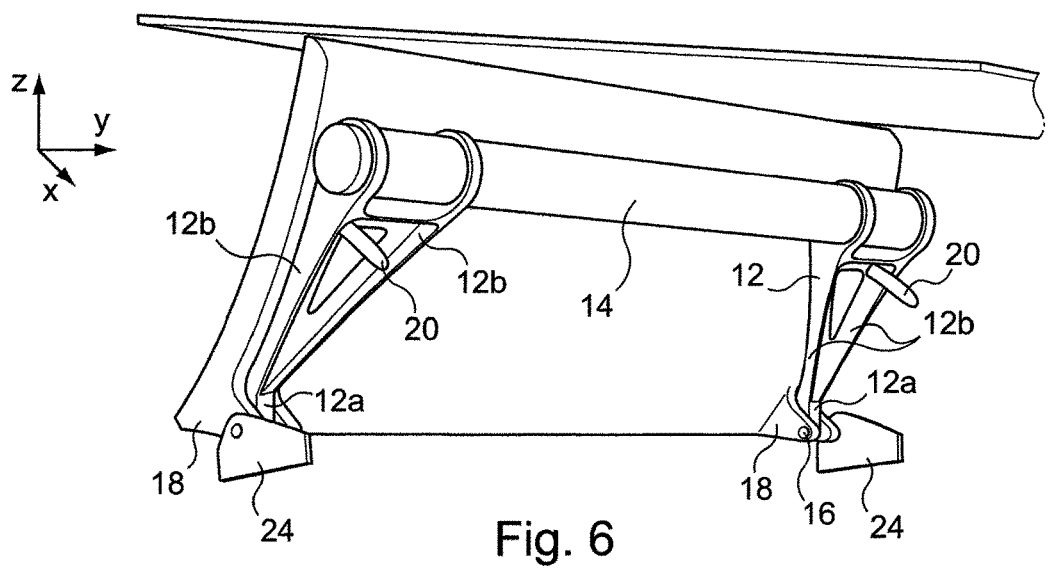
FIG. 6 is a perspective view of the rear face of a display device for a cockpit according to the present invention.
Figure 7:
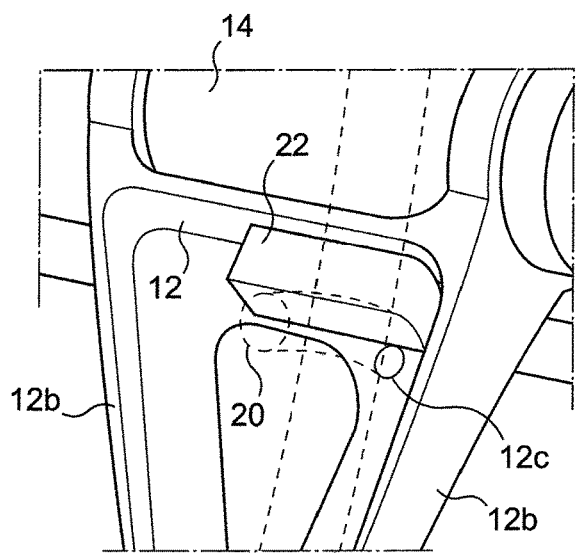
FIG. 7 shows an enlarged view of a locking device for the display device shown in FIG. 6, FIGS. 8A to 8C show, in three different positions, another display device able to be installed in a cockpit according to the present invention.

Also, in FIG. 3 and FIG. 6, a reference mark makes it possible to define a horizontal plane along axes x and y, and a vertical plane along axes y and z.

Figure 4:
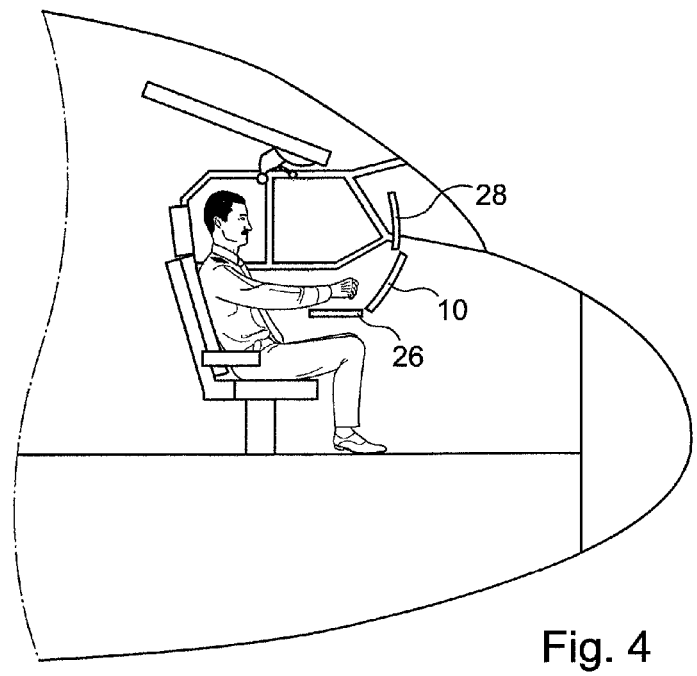
FIG. 4 is another diagrammatic side view of an aircraft cockpit according to the present invention.

The screen 10 is preferably concave, i.e., the side of the screen 10 facing the pilot is concave. This side of the screen thus has the shape of a circular cylindrical surface. The concavity of the screen 10 is such that the focal line, i.e., the axis of symmetry of the circular cylindrical shape of the screen, passes through the theoretical position of the pilot's eyes. Thus, the pilot views the screen 10 perpendicularly, regardless of the screen area viewed (in side view as shown for example in FIG. 4). In this way, it is possible to have a greater equivalent screen surface area (compared with a non-concave flat screen): the gain is estimated here at 6%.

The screen 10 is adjustable. In a preferred embodiment, provision is made for rotating this screen about two horizontal axes. In this way, it is possible to adjust the tilt of the screen with respect to the pilot and to change the height position of the screen and its distance from the pilot as explained below.

Adjustments to the screen 10 make it possible to reduce the reflections associated with the glare from outside that is often experienced in an aircraft cockpit during daytime flights. They also make it possible to change the position of the screen 10 and to orient it in relation to the position of the pilot, which may vary during a flight: for example while cruising, the pilot may adopt a position that is further back and more relaxed than that of the "theoretical" piloting position. When the screen 10 is a touch screen, it may also be preferable to be able to adjust the position of the screen to bring it closer to the user's hands.

Whether or not the screen is a touch screen, provision can be made to place control buttons for specific commands on its periphery, or on one and/or several edges of the screen. In this case also, the screen 10 is preferably sufficiently close to the pilot so that he has easy access to these control buttons.

FIGS. 5A to 5F show the motion of a display device according to the invention comprising the screen 10, and in particular a first pivot pin 16 and a second pivot pin 14 of the screen 10 and various positions that this screen 10 can adopt relative to a pilot.

Each screen 10 is mounted on two arms 12, preferably symmetrical or even identical, also shown in FIG. 6. Each arm 12 has a first end forming a bearing in which the first pivot pin 16 is fitted as well as a second end forming a bearing for a second pivot pin 14. The second pin 14 is a pin that is fixed with respect to the structure of the aircraft cockpit and allows rotation of the assembly formed by the arms 12 and the screen 10 while the first pin 16 is a mobile pin which makes it possible to change the relative position between the arms 12 and the screen 10.

The second pin 14 is placed forward of the screen 10 (taking account of the orientation of the aircraft; the screen is therefore between the second pin 14 and the pilot and, in most positions of the screen 10, the latter hides the second pin 14 from the pilot's view). The second pin 14 is for example a connecting rod with a relatively large cross section (for example a diameter greater than 50 mm) and forms part of the structure of the cockpit of the aircraft, or more generally of the structure of the aircraft. This connecting rod is for example used as a stiffener for the lower frame of the cockpit windscreen.

The arms 12 are therefore rotatably mounted on this second pin 14. As shown in FIG. 6, each arm 12 has the general shape of a Y, with a base 12a and two upper branches 12b. The free end of each of the upper branches has a housing forming a bearing to receive the second pin 14 so that it is able to rotate. The base 12b, here reduced in height, has a housing forming a bearing to receive a first pin 16. The rear face of the screen 10 (i.e., the face opposite that on which images are formed) has two stirrups 18 in each of which will be installed a base 12a of an arm 12, a first pin 16 passing through both the base 12b and the branches of the stirrup 18 so as to form a pivot link between the arm 12 and the screen 10. Anti-friction washers (not shown) can be provided in each (or only some) of the housings of the arms 12 receiving either the second pin 14 or a first pin 16.

Figure 5A:
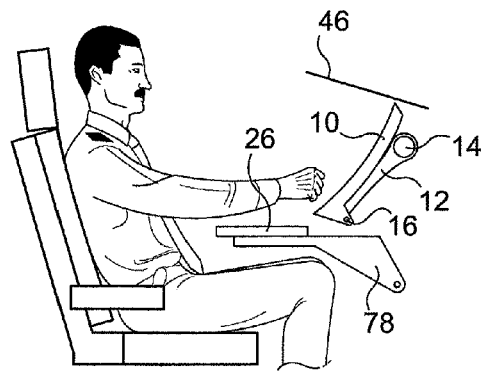
FIGS. 5A to 5F are diagrammatic side views showing an aircraft pilot seated on a seat facing an instrument panel in a cockpit according to the present invention.
Figure 5B:
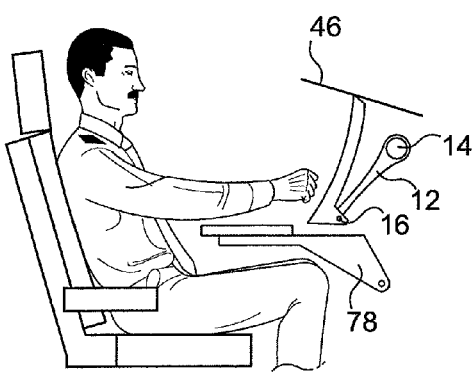

By combining the rotational movements, on the one hand, around the second pin 14 and, on the other hand, around the first pins 16, the pilot can tilt the screen 10, bring it closer to him and/or adjust its height. In FIG. 5A, the screen 10 is in a distant position with respect to the pilot and the second pin 14 here acts as a positioning stop. Tilt adjustment is then possible by rotating the arms 12 and the screen 10 around the second pin 14 or by rotating the screen 10 around the first pins 16 as shown in FIG. 5B.

Figure 5C:
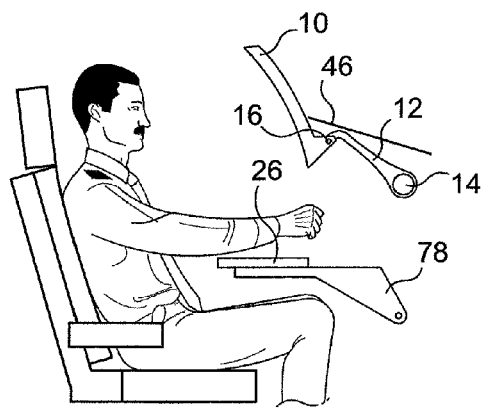
Figure 5D:
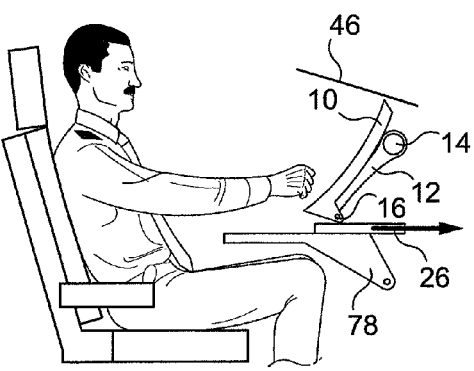
Figure 5E:
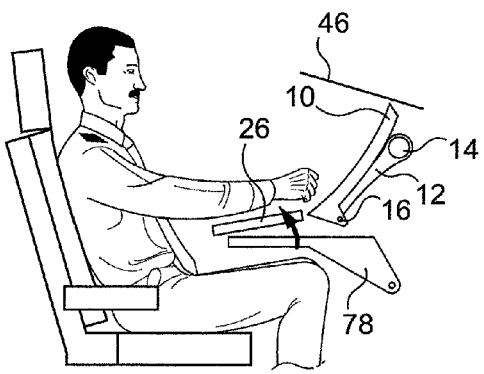
Figure 5F:
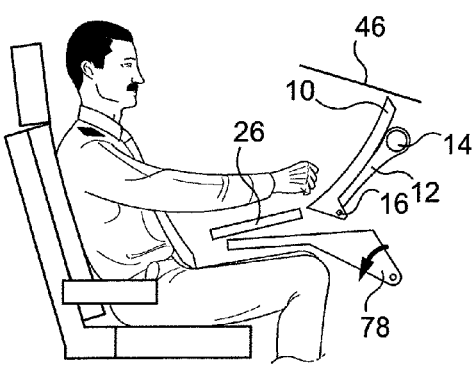

FIG. 5C shows a position in which the screen 10 is raised and placed in a high position. This position is in particular intended to allow access forward of the screen (in the direction of travel of the aircraft) for accessing in particular connections and electronic equipment as explained below.

Locking means are advantageously provided to allow the screen to be held in certain predetermined positions.

Thus provision is made for example for the presence of locking catches 20 mounted on the rear face of the screen 10 to cooperate with the arms 12. The locking catches 20 are curved so that when the screen 10 rotates in relation to the arms 12, the locking catches 20 can enter and leave a bore 12c provided in each arm 12. A locking device 22 mounted on each arm 12 on the side of the bore 12c makes it possible to hold the catch 20 in a given position in the bore 12c. Indexing can also be provided. In this event, the locking device 22 allows a locking catch 20 to be held in several predetermined positions.

In order to hold the arms 12 in a predetermined position, it is possible to provide for retaining feet 24 which will hold the stirrups 18, or only the pin 16, in a predetermined position. For example, the retaining feet 24 comprise a hole 25 in which one end of the pin 16 is fitted, so that pulling on a lower part of the screen is sufficient to extract it therefrom. The arms 12 can then no longer rotate about the second pin 14. According to another example, the retaining feet 24 cooperate with the stirrups 18 so that rotation about the first pin 16 can also be blocked, for example by means of cooperation between a loop and a hook, so that moving the retaining feet 24 away from one wall makes it possible to release the stirrups 18 and free the movement. The screen 10 can thus be held in a stowed position.

The screen 10 can be formed by a stiff support, for example made from a composite material, in particular a carbon-based composite material, and a flexible film for screen use. The support has for example a thickness of 25 to 30 mm and makes it possible to give the screen a concave shape.

As shown in particular in FIGS. 4 and 5A to 5F, a work surface 26 is placed between each screen 10 and the corresponding pilot. These work surfaces 26 make it possible to input data and to interact with the screen 10 and other systems of the aircraft. As shown in FIGS. 5A to 5F, the position of each work surface 26 can be adapted for improved ergonomics of the flight station, or according to the position of the pilot and/or the position of the screen 10.

Each work surface 26 has a width substantially equal to the width of the associated screen 10. In this way, the work surface 26 offers a large work area for the pilot. The work surface 26 can incorporate a keyboard and also comprise a device such as a computer mouse. This can also be a touch screen tablet thus forming an interface with the various avionics systems.

As previously described, in the cockpit described here, each pilot thus advantageously has available a screen 10 capable of adopting several working positions, but also at least one storage position, i.e., stowed position. This screen 10 as described above can be tilt-adjusted in order to prevent the pilot experiencing unwanted reflections. It is also incurved (concavity oriented towards the pilot) so as to optimize the display surface and allow the pilot a better view. The position of the screen with respect to the pilot is optimized depending on the nature of the screen: if the screen is a touch screen, it will preferably be placed closer to the pilots in order to facilitate the pilots' access to their screen. Finally, this screen is retractable (as in FIG. 5C) in order to allow access to the area located forward of the screen (in the direction of flight).

This screen 10 is associated with a work surface 26, also mobile in order to improve the ergonomics of each pilot's workstation. With the screen 10 and its work surface 26, the pilot can undertake not just the piloting but also the flight management of his aircraft.

The volume of the instrument panel is limited. This makes it possible to free space inside the cockpit. This freed space can be used to accommodate systems previously housed in other parts of the aircraft and/or to optimize the volume of the cockpit and its external aerodynamic shape.

The preferred embodiment described above makes provision for two mobile screens, one for each pilot, without providing any other screen at the same height as these two screens. It could however also be envisaged to have a fixed screen in the central area of the instrument panel, accessible and/or perfectly visible for both pilots, and a mobile screen 10, such as the screen 10 described above and as shown in particular in FIG. 6, on each side of this fixed screen.

A variant embodiment of a cockpit such as described above makes provision, in an original manner, for placing a third screen 28 in the central upper portion of the instrument panel. Provision is made for this third screen 28 to be positioned above the two previously described screens 10 and preferably straddling both, preferably equidistant from both flight stations. This positioning in an aircraft cockpit is totally original. In fact, this position is such that this third screen 28 partially obscures the pilot's view through the windscreen of the aircraft. Provision is made for retracting this third screen 28 so that the pilot can benefit, when necessary, from the best possible view through the windscreen. Such a third screen 28, its incorporation into an instrument panel and its possible use are described in greater detail in the remainder of the description.

It should be noted firstly that the regulatory requirements concerning visibility for pilots allow for the presence of a central "blind spot" for both pilots (or more accurately for the pilot and the co-pilot). Regulations therefore provide for a visual blind spot for the pilot and the co-pilot which is exploited in a totally original manner for installing a screen. FIGS. 3, 4, and 8 to 12 show how such a screen can be installed in an aircraft cockpit.

Figure 12:
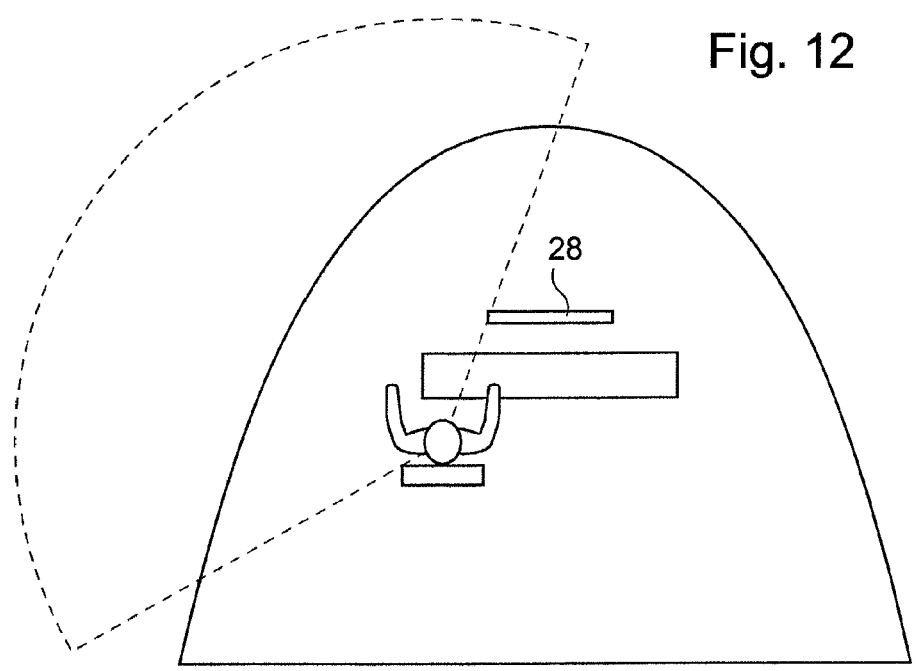
FIG. 12 is a diagrammatic top view of an aircraft cockpit according to the invention.

The presence of this screen 28 makes it possible to have in the cockpit an additional display surface in the field of view of the pilot and the co-pilot. Provision is made for retracting this screen so as to improve their view through the windscreen, by increasing their field of view therethrough. Thus, during the phases of flight for which visibility through the windscreen is not critical, the additional screen (or third screen 28) can be viewed by the pilots and during the phases of flight for which visibility through the windscreen is more critical, the additional screen is retracted as explained below. FIG. 12 shows the cockpit very diagrammatically in top view. This figure shows only, very diagrammatically, the shape of the cockpit, the third screen 28 in a deployed position in which it partially obscures a pilot's view through the cockpit windscreen, a pilot and a corresponding seat back, a work surface and, in dotted lines, a diagrammatic representation of the field of view of the pilot shown.

It is proposed here to render the third screen 28 mobile by means in particular of two curved and parallel tracks 30. Translational displacement of the third screen 28 with respect to the two tracks 30 is preferably carried out using a motor (not shown) but manual displacement can also be envisaged. Provision can also be made here for displacement toward the retracted position or toward the deployed position to be done automatically, without action by the pilots. Purely by way of illustrative example, provision can be made for example for the third screen 28 to retract (and be hidden from the pilots' view) as soon as the aircraft descends below a predetermined altitude. Conversely, still purely for the purposes of illustration, provision can be made for the third screen 28 to pass from a retracted position in which the pilots cannot see it from their seats to a deployed position, in which the third screen 28 is between the windscreen and the pilots, when the aircraft enters a cruising flight phase. A safety device can for example also be provided so that it is not possible for the third screen 28 to be in deployed position during the phases of takeoff, landing and taxiing.

Figure 8A:
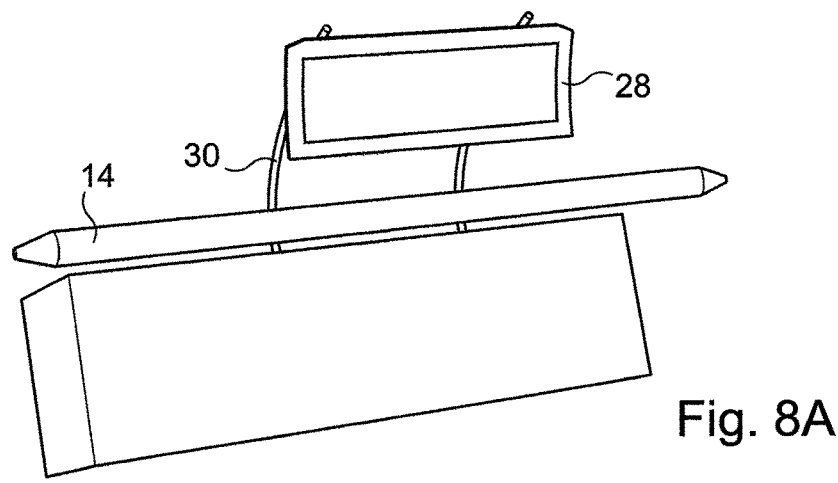
Figure 8B:
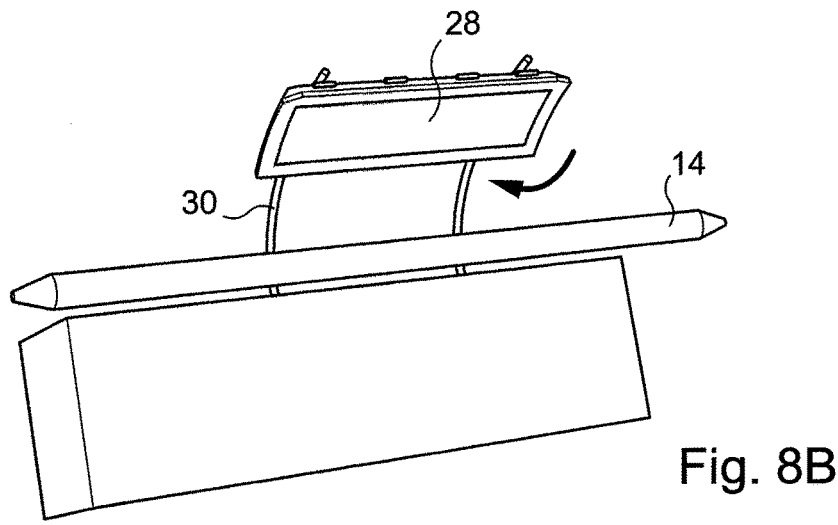
Figure 8C:
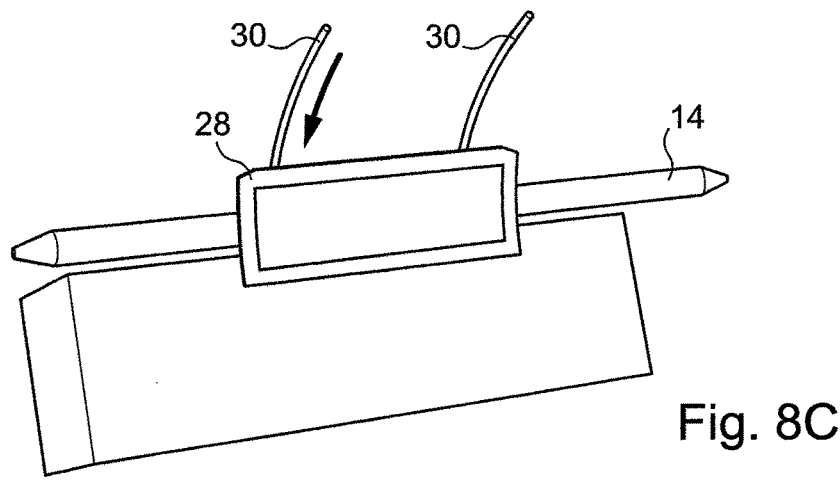

The third screen 28 is preferably also mounted rotatable about a third pin 32, also horizontal. Just as for the two screens 10, the ability to rotate the third screen 28 makes it possible for the pilots to avoid seeing reflections on this screen and to adopt a good position suitable for reading the information displayed on said screen. FIGS. 8A to 8C show various positions that can be adopted by the third screen 28. It is noted that this third screen 28 can translate along the tracks 30 and can also rotate about the third pin 32, which is a horizontal pin, close to the upper edge of the third screen 28.

The third screen 28 reproduces substantially the same features as the screens 10 described above. This is preferably an incurved screen with a concavity oriented toward the pilots and, advantageously, the screen is obtained by bonding —or any other suitable means of fastening—a flexible film for screen use onto a support, such as for example a sandwich panel made from a carbon-based composite material. However, a third screen 28 having different features would not exceed the scope of the present invention.

Figure 9:
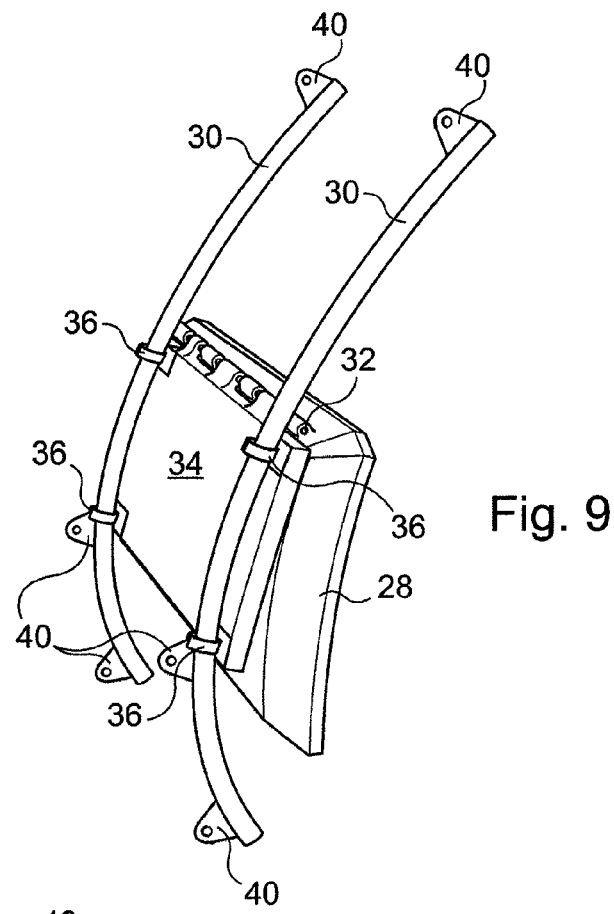
FIG. 9 is an enlarged perspective view from another viewing angle of the display device in FIGS. 8A to 8C.
Figure 10:
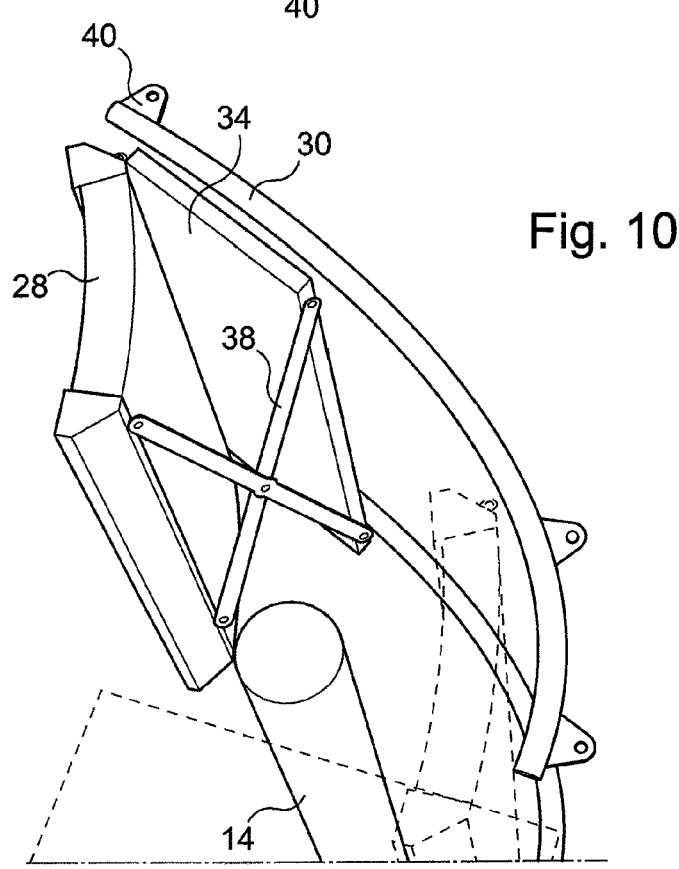
FIG. 10 shows the display device in FIG. 9 from another angle and in another position.

FIGS. 9 and 10 show in greater detail the means used to allow the displacement of the third screen 28. As shown in these figures, the third screen 28 is rotatably mounted on a carriage 34 that slides on the tracks 30.

The carriage 34 is presented in the form of a substantially rectangular plate. It thus has two main faces, an inner face, facing the third screen 28, and an outer face, opposite the inner face. The tracks 30 each extend in a plane that is substantially vertical (and longitudinal with respect to the axis of the aircraft). The carriage 34 has two long substantially horizontal edges linked joined by two short edges also in a substantially vertical plane parallel to the tracks 30. The third pin 32 is level with the horizontal upper edge of the carriage 34. The carriage 34 and the third screen 28 are connected in a hinged manner, the third pin 32 corresponding to the pin of said hinge.

The carriage 34 has on its face opposite its short edges, bearings 36, in which the tracks 30 slide. The bearings 36 are for example formed by open race ball bearings so as to ensure satisfactory sliding on the tracks 30. In the embodiment shown in the figures, four bearings 36 are placed on the outer face of the carriage 34, approximately at the four corners of the outer face.

The lower long edge of the carriage 34 (FIG. 10) is connected to the third screen 28 by a cross brace 38 which makes it possible, on the one hand, to better hold the third screen 28 with respect to the carriage 34 and therefore also with respect to the tracks 30 and, on the other hand, to lock the third screen 28 in relation to the carriage 34 in one (or more) predetermined position(s).

FIGS. 9 and 10 also show in particular the presence of fixing lugs 40 which allow the tracks 30 to be mounted on the structure of the cockpit.

Figure 11:
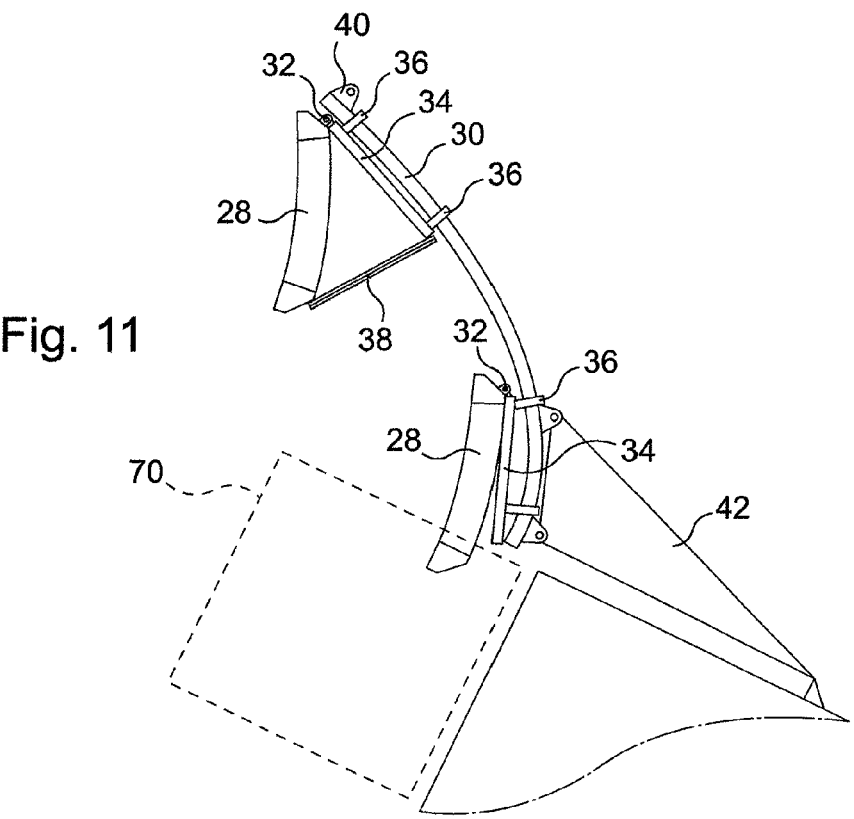
FIG. 11 shows the display device in FIGS. 8 to 10 in side view, in two different positions.
Figure 13:
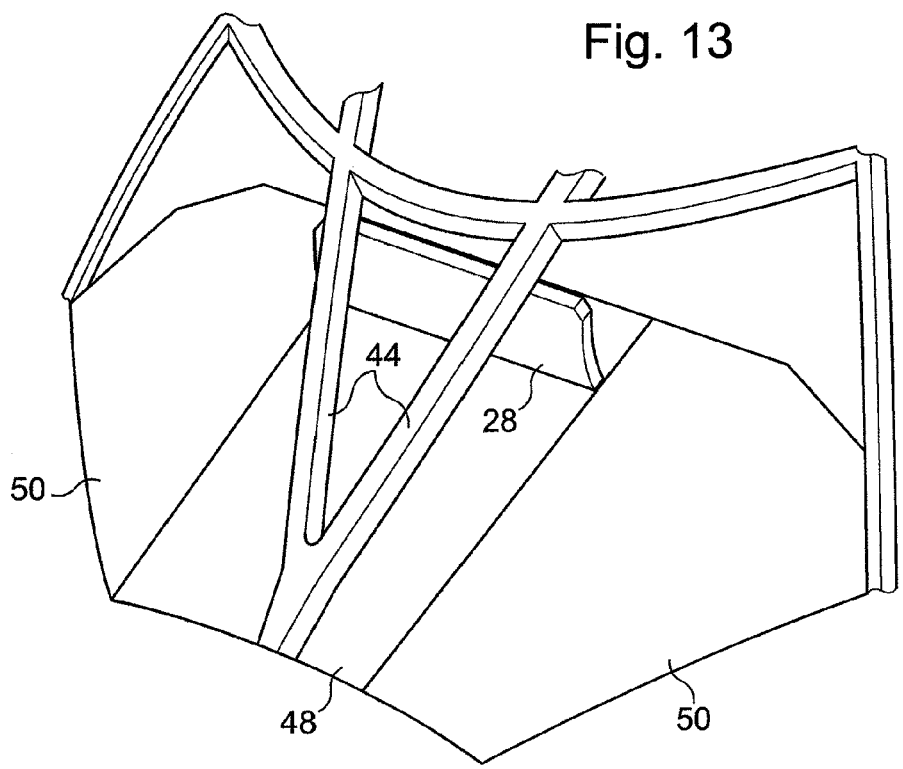
FIG. 13 shows in perspective top view a glare shield of an instrument panel of a cockpit according to the invention and part of its surroundings.
Figure 14:
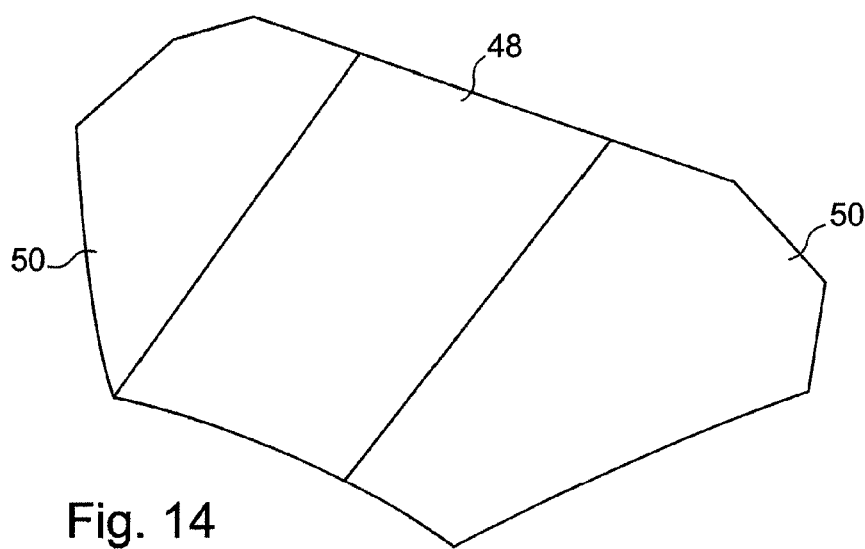
FIG. 14 shows only an instrument panel glare shield.

FIG. 11 shows a side view of the third screen 28 in a deployed position and in a retracted position. It also shows the lower attachment of the tracks 30. In the lower portion, each track 30 has two fixing lugs 40 connected to a structural part (described below) via a connecting triangle 42. In the upper portion, each track 30 has for example a fixing lug 40 intended to be fixed on a central V-post 44 of the cockpit windscreen (FIG. 13).

Some possible uses of a third screen 28 described above are proposed hereinafter. The examples are of course purely illustrative and other uses can of course be envisaged for this screen.

The third screen 28 can be considered as a secondary screen and is then used for displaying non-essential information (for example Internet access, cabin surveillance camera screen, etc.). The essential information relating to piloting is given on the screens 10.

This third screen 28 can also be used as an emergency screen in the event of failure of one of the screens 10 facing the pilots. This use can of course complement the use provided for in the previous paragraph.

It can also be envisaged to provide reversible fixing means of the third screen on its carriage. In such a scenario, the third screen could for example be detached and used in the aircraft, or outside the aircraft at a stopover, as a mobile tablet.

For the cockpit described above, it is also proposed here to produce a glare shield 46 which makes it possible essentially to avoid reflections on the main screens 10 as well as solar reflections which could disturb the pilots. This glare shield 46, in an original manner, is designed so that it does not constitute a dangerous obstacle for the pilots during sudden deceleration.

In a cockpit of the prior art, as shown in FIG. 1, the above-mentioned functions are performed by a control unit 4 which is placed overhanging the various screens, thus forming a visor. This control unit 4 is fixed below a stiff upper plate which is difficult to remove. The edge of the upper plate facing the pilots is protected by a foam overmolding intended to absorb frontal impacts in the event of sudden deceleration. The upper plate prevents, or makes very difficult, any access forward of the instrument panel (in the direction of flight of the aircraft) and therefore to all the connections and devices placed between the instrument panel and the front end of the cockpit.

It is proposed here to produce a glare shield 46 in three portions: a central portion 48 and two side portions 50.

The central portion 48 is for example stiff. It is placed in front of the pilots and between them. It extends backwards from the lower frame of the windscreen while partially covering the screens 10 in their working position (FIG. 5A or 5B for example). The width of this central portion is limited so that it is located outside any area at risk in the event of a crash. In this way, in the event of sudden deceleration, there is no risk of collision between a pilot, in particular a pilot's head, and the central portion 48 of the glare shield.

Figure 15:
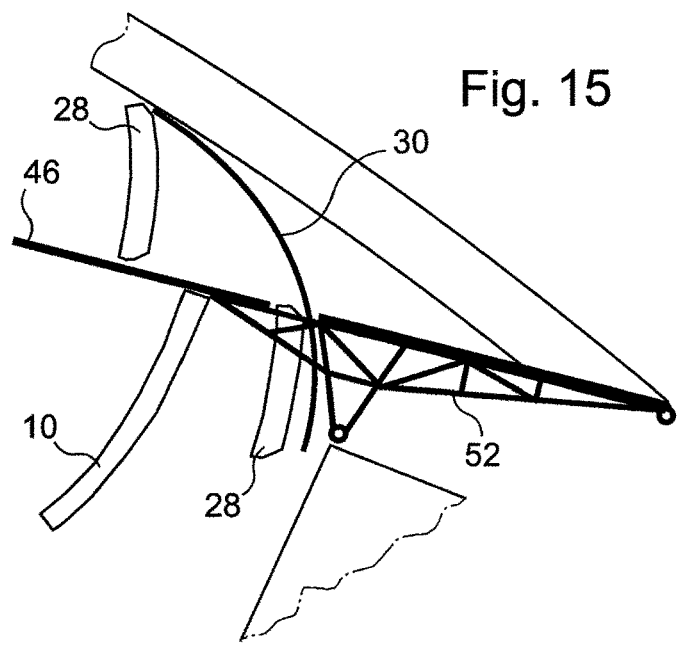
FIG. 15 shows diagrammatically in side view the glare shield in FIG. 14 in its surroundings.

This central portion 48 is for example made from a composite material that has the advantage of being strong and light. It can thus be constituted by a carbon-based sandwich panel and have a thickness of the order of 10 to 12 mm. Two lateral metal structures 52 (one of which is shown in FIG. 15), for example comprising a truss, advantageously contribute to the support and stiffening of the central portion 48 when positioned in the cockpit, preferably just above the screens 10, and so that the third screen 28 in its deployed position is above the glare shield 46. In the embodiment shown, the central portion has a front edge (in the direction of travel of the aircraft) that adopts the shape of the windscreen at the level of its lower frame, and a rear transverse edge on the side of the pilots. Lateral edges join the ends of the front edge to the ends of the rear edge. The metal lateral structures 52 support the lateral edges of the central portion 48 or extend parallel to these lateral edges and close to them (from a few millimeters to a few centimeters, for example from 1 to 10 centimeters).

Preferably, the width of the central portion 48 is, at least locally, greater than the width of the third screen 28. An opening can then be made in the central portion 48 to allow the passage of the third screen 28 when it passes from a retracted position to a deployed position.

The two lateral portions 50 of the glare shield 46 are symmetrical with respect to the central portion 48. These lateral portions 50 are made from a flexible material which is held taut so as to form a substantially planar surface. These lateral portions 50 can thus for example be made from a fabric. This fabric is partially fixed on its surround (frame of windscreen glass, stiff central portion 48 of the glare shield) and partially by a thin cable itself held taut by a suitable device. The chosen fabric used is preferably a thin, light fabric; strong and flexible so that it can be held taut with moderate force. The fact that the parts opposite the pilots are flexible thus makes it possible to reduce the risk of frontal impacts in the event of sudden deceleration.

The lateral portions 50 and the central portion 48 preferably have an upper face with a non-reflective appearance. They can for example have an upper face that is matte black in color.

Figure 16:
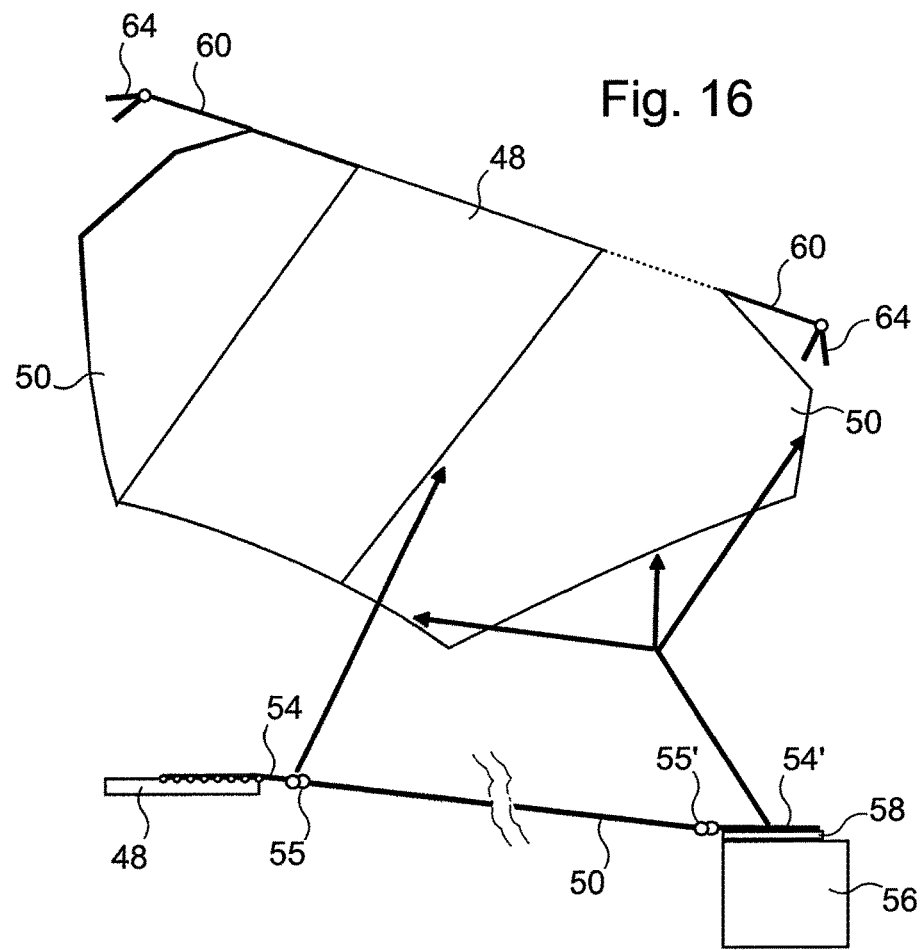
FIG. 16 shows the mounting principle of the glare shield in FIGS. 13 to 15.

FIG. 16 shows the assembly of a lateral portion 50. The bottom part of FIG. 16 is a diagrammatic side view while the top part of this figure is a diagrammatic perspective view. Arrows between the two parts of the figure show the correspondence between these two parts of the figure.

It is proposed here for example to fix each lateral portion 50 to the surrounding structure using zip fasteners 55 (such as for example those sold under the "Eclair" trade mark). Such a fastener 55 comprises two parallel tapes edged with a toothed rack the teeth of which (made of metal or synthetic material) engage by means of a slider (small movable sliding element) that merely needs to be pulled. In the present case, for a first zip fastener 55, a first tape 54 is fixed to the central portion 48 of the glare shield and the other tape is formed by the lateral portion 50 the corresponding edge of which has a toothed rack complementary to the toothed rack of the corresponding first tape. The first tape 54 is for example fixed by bonding (symbolized in FIG. 16 by dots). The lateral portion 50 is also fixed on the lower structure, or lower frame 56, of the windscreen. This fixing is also carried out by a zip fastener 55'. A first tape 54' of the zip fastener 55' is fixed on the lower frame 56 using, for example, a self-gripping ribbon 58. A self-gripping ribbon comprises a surface provided with hooks and another surface provided with corresponding loops. It is proposed here that the first tape 54' bears, on the one hand, hooks or loops and, on the other hand, a toothed rack on one of its edges. The other surface of the self-gripping ribbon 58, with the loops or the hooks, is fixed onto the lower frame 56. The corresponding lateral portion 50 also comprises on its edge facing the lower frame 56 a toothed rack capable of cooperating with the toothed rack of the first tape 54' to form, with a slider, a zip fastener 55'.

Figure 17:
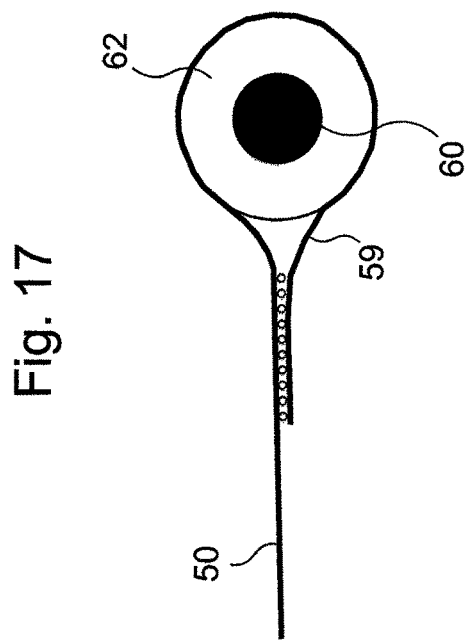
FIG. 17 shows diagrammatically an enlarged view of a mounting detail of an instrument panel glare shield.
Figure 18:
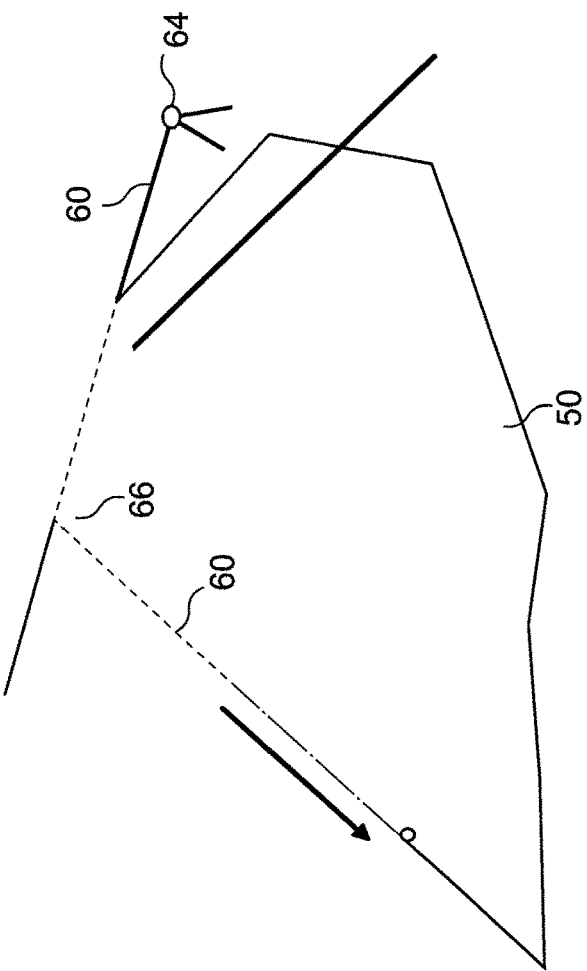
FIG. 18 shows diagrammatically tensioning means for a glare shield shown in FIGS. 13 to 17.

Holding the free edge of the lateral portion 50, i.e., the edge facing a pilot (or co-pilot), is shown in FIGS. 17 and 18. The free edge of the lateral portion 50 is shown in an enlarged cross section in FIG. 17. This edge has a hem 59 which is shown as being produced by bonding (dots representing blobs of glue). However, other methods of realization—sewing, self-gripping tape, stapling, etc.—could of course be envisaged here. The hem 59 contains a tension cable 60 protected by a foam covering 62.

The tension cable 60 is formed of two separate parts: a first part is formed by a strand or braid that is flexible but made from a material with a low modulus of elasticity and a second part with a much higher modulus of elasticity. The first part of the tension cable 60 behaves like a metal cable that is flexible but does not stretch—or stretches very little—when subjected to traction. This first part is shown by a solid line then a dotted line (because it is inside the hem 59) in FIG. 18. The second part of the tension cable 60 is much more elastic and deforms like rubber for example. This second part is shown by a dash-dotted line in FIG. 18.

The two ends of the tension cable 60 are fastened to a fixed point. A first fixed point is for example produced by a micro strut 64 which is located for example on a windscreen post. The second fixed point is an attachment point produced on a lateral edge of the central portion 48. A pulley 66 is used to change the orientation of the tension cable 60.

During the mounting of the tension cable assembly 60, its length is adapted to obtain the desired tension. The second part of the tension cable makes it possible to hold this tension over time and ensures a taut fabric for producing the lateral part 50 of the glare shield 46. Moreover, this second cable part allows the fabric to deform in the event of impact.

The glare shield 46 thus produced allows its primary functions to be performed (preventing the various reflections and improving the pilots' view of their screens). It does not form a troublesome obstacle in the event of a frontal impact as it is deformable. Finally, it has the advantage that it can be dismantled and easily allows access forward of the screens of the instrument panel. In a totally original manner, it becomes possible with a glare shield such as described above to gain access from above to the connections and items of equipment located forward of the instrument panel. Moreover, the glare shield thus produced is very light in comparison with the glare shields of the prior art and has a greatly reduced space requirement. It is also highly adjustable (shape, position, etc.).

In a variant embodiment, a glare shield can also be envisaged that is made entirely from flexible material. The fixing principle remains similar, with the ability to also use the lateral metal supports to tension the fabric.

As is apparent from the preceding description, in particular by using flat screens and simplifying the instrument panel, space is available forward of the screens 10. In addition, access to this space is doubly facilitated as it is possible to gain access, on the one hand, by displacing the screens 10 and, on the other hand, by removing the glare shield 46, which is easily dismantled, at least as far as its lateral parts 50 are concerned.

Finally, as shown in FIG. 15 for example, the glare shield 46 is preferably slightly tilted so that its front edge is slightly lowered, limiting the presence of the upper face of the glare shield 46 in the pilots' field of view.

It is proposed here to accommodate behind the screens 10 electronic equipment that is usually located (for the aircraft to which the present invention relates) in a hold below the cockpit. As shown in particular in FIG. 20, an avionics unit is advantageously located at the front of the cockpit. The location of this unit, shown only in FIG. 19, is described hereinafter.

The chosen site is suitable for receiving a rack of the IMA (Integrated Modular Avionics) type. This novel avionics format aims to group software functions together in identical modular calculators. These software functions have each hitherto been performed by dedicated calculators.

An example of an IMA type rack is shown in FIG. 19. A motherboard 68 is installed at the base of the unit and receives electronic cards, or daughter cards, 70. The daughter cards 70 are all arranged in parallel, side by side, and extend perpendicularly to the motherboard 68.

It is therefore proposed to have such a rack available forward of the screens 10 of the instrument panel, said rack being borne by a support 72. The latter is fixed to the structure of the aircraft so as to receive the IMA type rack. The support 72 has an upper face bearing the IMA type rack. The motherboard extends perpendicularly to the upper face of the support 72 and the daughter cards 70 are connected and disconnected by a translational movement parallel to the upper face of the support 72. As shown for example in FIG. 20, the upper face of the support 72 is tilted toward the front of the cockpit. The motherboard 68 is in a forward position, i.e., toward the front of the cockpit and the daughter cards 70 disconnect from their motherboard 68 in an upward translational movement toward the rear of the aircraft.

The support 72, due to its position in particular, can perform many other functions. Thus for example, the lower face of the support can be used to support a rudder bar 76. The latter is a flight control by which the pilot acts on the rudder units and can control rotation of the aircraft about its yaw axis. Conventionally, a rudder bar 76' is operated by the pilot with both feet. The control means, most frequently pedals, are mounted on the floor of the cockpit. In order to simplify the structure of the cockpit and free up the floor, it is advantageously proposed here to fix the pedals of the rudder bar 76 below the support 72, as shown in dotted lines in FIG. 20.

As shown in FIG. 21, the support 72 is preferably mounted rotatable about a substantially horizontal fixed pin 74. In order to simplify the structure of the assembly formed by the support 72 and the control pedals 76 of the rudder bar, the axis of rotation of these pedals 76 corresponds to the pivot pin 74 of the support 72.

The support 72 bears a housing 82 described in greater detail below. The assembly formed by the support 72 and the housing 82 is advantageously used to receive the work surfaces 26. The support 72 and the housing 82 thus bear a mobile pair of arms 78 that is positioned in front of each pilot, at the level of the corresponding screen 10. As shown in FIG. 20, a pair of arms 78 is rotatably mounted with respect to the support 72 and a cylinder 80 allows adjustment of the relative position between the support 72 and the arms 78. The work surface 26 can also be displaced in translation and in rotation with respect to the corresponding pair of arms 78. Numerous adjustments are thus possible and each pilot can then adapt his work surface to the best position depending on his morphology, the adjustment of his seat, his position, or other factors. FIGS. 5A to 5F show various positions which can be adopted by the work surface 26.

Provision is made for the work surface 26 to connect the two arms of a pair of arms 78 each time. Provision can also be made to mount a plate on each pair of arms 78 and to displace the work surface 26 with respect to the plate connecting the corresponding arms. In the former instance a maximum of space is freed in front of the pilot, in the latter, the plate forms a surface on which the pilot can place various objects, thus forming a work surface.

Between the two pairs of arms 78 (one in front of the pilot and the other in front of the co-pilot), provision can be made for two fixed arms (not shown) to form a work surface between the two pilots. It is not necessary a priori to make provision for adjusting the position of such a work surface but of course it is possible to provide either full adjustment of the position of this work surface, or simply to provide the ability to fold it back in order to free space.

As is usual for this type of equipment, the IMA type rack also incorporates ventilation of the electronic components. This ventilation is obtained by forced blowing and by forced extraction of air. The housing 82 is provided on the support 72. This is a sealed hollow housing 82, intended to fulfill the function of distributing pressurized air. Aspiration is provided by an element 84 placed over the whole of the upper face of the IMA type rack. This element 84 thus serves both as a cover for the aspiration and as an umbrella, thus ensuring protection of the computer equipment against any leakage that may occur as a result for example of condensation. To provide the function of cooling the electronic equipment of the IMA type rack, the housing 82 and the element 84 are connected to the independent circuits (not shown) provided as standard in an aircraft for the blowing and extraction of air dedicated only to the electrical systems.

In an original manner, it is proposed here to also incorporate the function of air conditioning of the front end of the cockpit into the housing 82. The latter is then divided into two parts (FIG. 20). One part is then dedicated to blowing air toward the electronic components while the other part is dedicated to the air conditioning of the front portion, in particular the lower front portion, of the cockpit. Diffusers are then provided to send conditioned air toward the feet of the pilots. The second part of the housing 82 is here connected to a branch (not shown) of the air conditioning circuit of the aircraft. This integration makes it possible to simplify the installation in this area of the cockpit and thus ensure savings, with respect to volume, cost of production and integration and finally weight, for the aircraft.

Access to the daughter cards 70 can easily be provided by placing the screens 10 in the position shown in FIG. 5C. For access to the connections at the rear of the IMA type rack, as already mentioned above, provision is made to tilt the support 72 as shown in FIG. 21, the support 72 being rotatable about the pivot pin 74. This figure also shows the one of the support brackets 86 that bears the pivot pin and the support 72. These support brackets 86 are mounted directly on the structure of the aircraft.

The solution described allows the space at the front of a cockpit to be optimized. The avionics equipment placed forward of the screens is in a site that is very secure due to its location close to the pilots.

The proposed solution also allows simplification of the arrangement of the front portion of the cockpit despite the incorporation of a large number of functions.

The novel cockpit concept as described above makes it possible to achieve a very innovative aircraft flight station allowing savings to be made in particular in respect of weight, volume and production costs, for maintenance and also in terms of security. This solution allows in particular better integration of avionics systems of the aircraft.

The present invention is not restricted to the preferred embodiment described above as a non-limitative example and shown in the drawings, nor to the variants mentioned. It relates to all the variant embodiments available to a person skilled in the art within the framework of the claims hereinafter.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft cockpit comprising:
   a first seat intended to accommodate a pilot,
   a second seat intended to accommodate a co-pilot,
   at least one first display device comprising a first screen facing the first seat,
   at least one second display device comprising a second screen facing the second seat, and
   a windscreen,
   a third display device having a third, mobile, screen and a support allowing the third screen to be displaced from a first position known as a deployed position to a position known as a retracted position,
   wherein in the deployed position the third screen is above the first screen and the second screen so as to be visible both for a person seated on the first seat and for a person seated on the second seat and obscures a portion of the windscreen both for the person seated on the first seat and the person seated on the second seat, and
   wherein in the retracted position the third screen is lowered with respect to its deployed position so as to at least partially make the portion of the windscreen obscured in the deployed position visible for the person seated on the first seat and for the person seated on the second seat.

2. The aircraft cockpit according to claim 1, wherein the third screen in its deployed position is placed in a central position in the cockpit, and wherein in the retracted position the third screen is placed partially behind the first screen and partially behind the second screen for the person seated on the first seat or the second seat.

3. The aircraft cockpit according to claim 1, wherein the third screen is mounted on tracks, mobile between its deployed position and its retracted position.

4. The aircraft cockpit according to claim 1, wherein the third screen is mounted rotatable about a substantially horizontal pin.

5. The display device according to claim 4, wherein the support comprises a second, substantially horizontal, fixed pin and at least one arm having a first end rotatably mounted on the first pin and a second end bearing the second, fixed pin.

6. The aircraft cockpit according to claim 1, further comprising a glare shield covering the first display device and the second display device, wherein the third screen in its deployed position is above the glare shield, wherein the third screen in its retracted position is below the glare shield, and in that a through opening is made in the glare shield to allow the third screen to pass through when it passes from its deployed position to its retracted position or vice versa.

7. The aircraft cockpit according to claim 6, wherein the glare shield comprises:
   a central portion and
   two lateral portions,
   each lateral portion comprises a piece of fabric and tensioning means for holding said fabric.

8. The aircraft cockpit according to claim 7, wherein the central portion is a stiff portion and serves partially structurally for holding each piece of fabric of the lateral portions.

9. The aircraft cockpit according to claim 7, wherein the tensioning means comprise a cable having an area with a low modulus of elasticity and at least one elastically deformable area with a substantially higher modulus of elasticity.

10. The aircraft cockpit according to claim 7, wherein the tensioning means comprise a zip fastener.

11. The glare shield according to claim 7, wherein the central portion and lateral portions of the glare screen are made from a taut fabric.

12. The aircraft cockpit according to claim 1, wherein the third screen is concave.

13. The aircraft cockpit according to claim 1, wherein the support provides height adjustment of the screen.

14. The display device according to claim 1, wherein the third, mobile, screen comprises a flexible thin film, fixed on a stiff panel made from composite material.

15. The display device according to claim 1, wherein the third, mobile, screen has a frame on which control buttons are placed.

16. The aircraft cockpit according to claim 1, wherein said first display device comprises a first support, wherein the first screen is mounted on the first support rotatable about a first, substantially horizontal pin, and wherein the first support provides height adjustment of the first screen.

17. The aircraft cockpit according to claim 1, wherein said second display device comprises a second support, wherein the second screen is mounted on the second support rotatable about a first, substantially horizontal pin, and wherein the second support provides height adjustment of the second screen.

18. The aircraft cockpit according to claim 1, further comprising an avionics unit placed forward of at least one of the display devices.

19. The aircraft cockpit according to claim 18, wherein an avionics support bears the avionics unit.

20. The aircraft cockpit according to claim 19, wherein the avionics support is substantially planar, wherein an electronic board, known as the motherboard, extends substantially perpendicularly to the support and receives electronic boards, known as daughterboards, which extend perpendicular both to the motherboard and to the support.

21. The aircraft cockpit according to claim 19, wherein the support of the avionics unit is shaped so as to be able to support an input keyboard.

22. The aircraft cockpit according to claim 19, wherein the avionics support comprises an upper face and a lower face, wherein the upper face receives said electronic equipment, and wherein the lower face is shaped to support at least one rudder bar.

23. The aircraft cockpit according to claim 19, wherein the avionics support is mounted rotatable about a fixed pin.

\* \* \* \* \*